US007075553B2

(12) United States Patent
Miller et al.

(10) Patent No.: US 7,075,553 B2
(45) Date of Patent: Jul. 11, 2006

(54) METHOD AND SYSTEM FOR DISPLAYING AN IMAGE

(75) Inventors: Michael E. Miller, Rochester, NY (US); Paul W. Jones, Churchville, NY (US); Jian Yang, Penfield, NY (US); Majid Rabbani, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/838,682

(22) Filed: May 4, 2004

(65) Prior Publication Data

US 2004/0207632 A1    Oct. 21, 2004

Related U.S. Application Data

(62) Division of application No. 09/971,346, filed on Oct. 4, 2001, now abandoned.

(51) Int. Cl.
*G09G 5/02* (2006.01)

(52) U.S. Cl. .................. 345/598; 345/428; 345/555; 345/601; 345/602

(58) Field of Classification Search ............... 345/428, 345/555, 586, 592, 598, 601, 602, 700, 781, 345/782, FOR. 130; 351/238; 396/18, 51; 700/259

See application file for complete search history.

(56) References Cited

U.S. PATENT DOCUMENTS 5,175,617 A    12/1992  Wallace et al.

| | | | |
|---|---|---|---|
| 6,236,342 B1* | 5/2001 | Symes | 341/67 |
| 6,785,423 B1* | 8/2004 | Joshi et al. | 382/235 |
| 2002/0087728 A1* | 7/2002 | Deshpande et al. | 709/246 |
| 2003/0018818 A1* | 1/2003 | Boliek et al. | 709/247 |

FOREIGN PATENT DOCUMENTS

WO    WO 98/33315    7/1998

OTHER PUBLICATIONS

JPEG 2000 Part I Final Committee Draft Version 1.0 [online], [retrieved on Aug. 30, 2005]. Retrieved from the Internet:<URL: http://www.jpeg.org/public/fcd15444-1.pdf>. pp. 58-61, 68-69, 171-174.*

Reinagel et al., Natural Scene Statistics At the Centre of Gaze, Network: Computer Neural Syst. 10 (1999), pp. 341-350.

Cartier et al., Target Attractiveness Model For Field-of-View Search, Opt. Eng., vol. 37, No. 7, Jul. 1998, pp. 1923-1936.

(Continued)

*Primary Examiner*—Richard Hjerpe
*Assistant Examiner*—G. F. Cunningham
(74) *Attorney, Agent, or Firm*—Robert Luke Walker (57) ABSTRACT

A method and system for displaying an image, includes steps and means for: storing image data in a manner that enables retrieval of different spatial regions of an image at different fidelities; determining an viewer's point of gaze on a display; retrieving image data for each spatial region of an image at a fidelity that is a decreasing function of the distance of the regions from the point of gaze; and displaying the retrieved image data on the display.

20 Claims, 5 Drawing Sheets

OTHER PUBLICATIONS

Itti et al., A Saliency-Based Search Mechanism for Overt and Covert Shifts of Visual Attention, Vision Research 40, 2000, Elsevier Science Ltd., pp. 1489-1506.

Girod, Eye Movements and Coding of Video Sequences, SPIE, Visual Communications and Image Processing, vol. 1001, 1988, pp. 398-405.

Locshky et al., Perceptual Effects of a Gaze-Contingent Multi-Resolution Display Based On A Model of Visual Sensitivity, prepared through collaborative participation in the Advanced Displays and Interactive Displays Fed Lab Consortium sponsored by the US Army Research Laboratory Under Cooperative Agreement DAAL01-96-2-0003, pp. 53-58.

Duchowski, Acuity-Matching Resolution Degradation Through Wavelet Coefficient Scaling, IEEE Transacations of Image Processing, vol. 9, No. 8, 2000, pp. 1437-1440.

Land et al., The Relations Between Head and Eye Movements During Driving, Vision in Vehicles—V, Gale et al., Editors, 1996 Elsevier Science B.V., pp. 153-160.

Jones et al., Comparative Study of Wavelet and DCT Decompositions With Equivalent Quantization and Encoding Strategies for Medical Images, Proc. SPIE Medical Imaging, vol. 2431, pp. 571-582.

Lee, Coding of Still Pictures, JBIG and JPEG, ISO/IEC JTC 1/SC, 20/WG, 1(ITU-T SG8), Sep. 25, 2000, (front page only).

* cited by examiner

METHOD AND SYSTEM FOR DISPLAYING AN IMAGE

CROSS REFERENCE TO RELATED APPLICATION

This is a divisional of application Ser. No. 09/971,346, filed 04 Oct. 2001 now abandoned.

FIELD OF THE INVENTION

The present invention relates to the retrieval, transmission, and display of digital images and, more particularly to the retrieval, transmission, and display of images based on knowledge of the display viewer's point of gaze.

BACKGROUND OF THE INVENTION

The human visual system is capable of sampling information from a wide field of view. Immersive display systems, which allow an viewer to sample information from a wide field of view, must be perceived as displaying high resolution information across the viewer's entire field of view. The data requirements for maintaining high resolution information across the entire display can be substantial. For example, a highly immersive display may require that information be displayed within a 120 degree vertical by 180 degree horizontal field of view. Assuming 60 pixels are required for the display of one linear degree of visual angle, the immersive display system must allow nearly 78 million pixels or about 230 Mbytes of information to be retrieved, transmitted and displayed for a single three color, 8 bit still image. This amount of information can be multiplied by 30 or more when displaying the sequential frames of video information. Unfortunately, current information retrieval and transmission systems do not allow the transmission of this amount of information in real time.

Many image compression techniques have been discussed within the existing art that can reduce the amount of memory needed to store an image and bandwidth to retrieve and transmit an image. Unfortunately, commonly used techniques, such as JPEG or JPEG 2000 compression, typically reduce the amount of information required by a factor of 50 or less, which is not sufficient. Motion image compression schemes such as MPEG are also limited when attempting to compress images for truly immersive display systems. All of these compression schemes attempt to provide images with equivalent fidelity across an viewer's entire field of view. However, it is well known that the human visual system is not isotropic and that the resolution of the eye decreases rapidly with increased eccentricity from the point of gaze. This property of the visual system provides an opportunity for more efficient display systems.

Display systems have been discussed in the prior art that take advantage of the non-isotropic properties of the human visual system. These systems make use of foveated images, where the fidelity of the image is highest at the point of gaze and then decreases away from the point of gaze. For example, Girod in Eye Movements and Coding of Video Sequences, *SPIE: Visual Communications and Image Processing,* 1988, vol. 1001, pp. 398–405 discusses the possibility of constructing a gaze contingent display system without providing details on the implementation of such a system.

Geisler et al. in International Publication WO 98/33315 published Jul. 30, 1998, discuss the use of gaze contingent information to reduce the transmission bandwidth of imagery in remote pilotage applications. While Geisler et al. discuss the filtering of the high resolution image to produce a foveated image, this filtering occurs immediately after capture, and information that is not required for transmission is discarded. Wallace et al. in U.S. Pat. No. 5,175,617 issued Dec. 29, 1992, discuss a similar system for the real-time transmission of spatially non-isotropic imagery.

Loschky, et al. in Perceptual Effects of a Gaze-Contingent Multi-Resolution Display Based on a Model of Visual Sensitivity, prepared through collaborative participation in the *Advanced Displays and Interactive Displays Fed Lab Consortium*, sponsored by the US Army Research Lab, pp. 53–58, also discuss the use of non-isotropic images. However, in their implementation, a different set of image data is stored for each and every potential point of gaze position within the image. This implementation, when combined with proper encoding technology, may have the opportunity to decrease the bandwidth required for image retrieval and transmission, but it significantly increases the required storage as all possible foveated images must be stored for a given image.

It should also be understood that each of the systems described in the prior art assume that only a single viewer will view a display at a time. However, immersive display systems with a very large field of view may still achieve significant bandwidth savings even when the image is rendered to provide multiple points of gaze. The generation of multiple regions of interest within a single image has been discussed within other contexts. For example, Andrew T. Duchowski in Acuity-Matching Resolution Degradation Through Wavelet Coefficient Scaling, *IEEE Transactions on Image Processing*, 9(8), pp. 1437–1440, describes a method for creating multiple regions of interest in an image, which roughly correspond to multiple areas of high-resolution imagery in an image in which all surrounding imagery is of lower resolution. However, the author does not discuss a means for selecting the regions of interest using numerous points of gaze.

It should also be pointed out that the prior art in gaze contingent display technology does not recognize that all eye tracking devices have some error when determining point of gaze. There is also no prior art that discuss countermeasures to be taken when the system retrieval rate is not adequate to support the optimal image fidelity.

There is a need therefore for a system that utilizes an improved method for efficiently retrieving and transmitting image data in a way that different spatial regions of the image have different fidelity as a function of the distance from an viewer's point of gaze. Further, there is a need for this system to react to other system issues such as multiple viewers, inaccurate eye tracking devices, and extreme bandwidth limitations.

SUMMARY OF THE INVENTION

The need is met according to the present invention by providing a method and system for displaying an image, including steps and means for: storing image data in a manner that enables retrieval of different spatial regions of an image at different fidelities; determining an viewer's point of gaze on a display; retrieving image data for each spatial region of an image at a fidelity that is a decreasing function of the distance of the regions from the point of gaze; and displaying the retrieved image data on the display.

Advantages

The present invention has the advantage that it allows a full resolution image to be stored in such a manner that allows efficient retrieval and transmission of image data that varies in fidelity as a function of the distance from an viewer's point of gaze, reducing system bandwidth requirements for retrieval and transmission. Additionally, the data format allows images to be retrieved and transmitted in a way that allows the necessary image data to be displayed to more than one viewer. Finally, the invention allows the system to react to changes in the accuracy of the eye tracking device and/or changes in system bandwidth in order to deliver an acceptable image to the viewer.

DETAILED DESCRIPTION OF THE INVENTION

Figure 1:
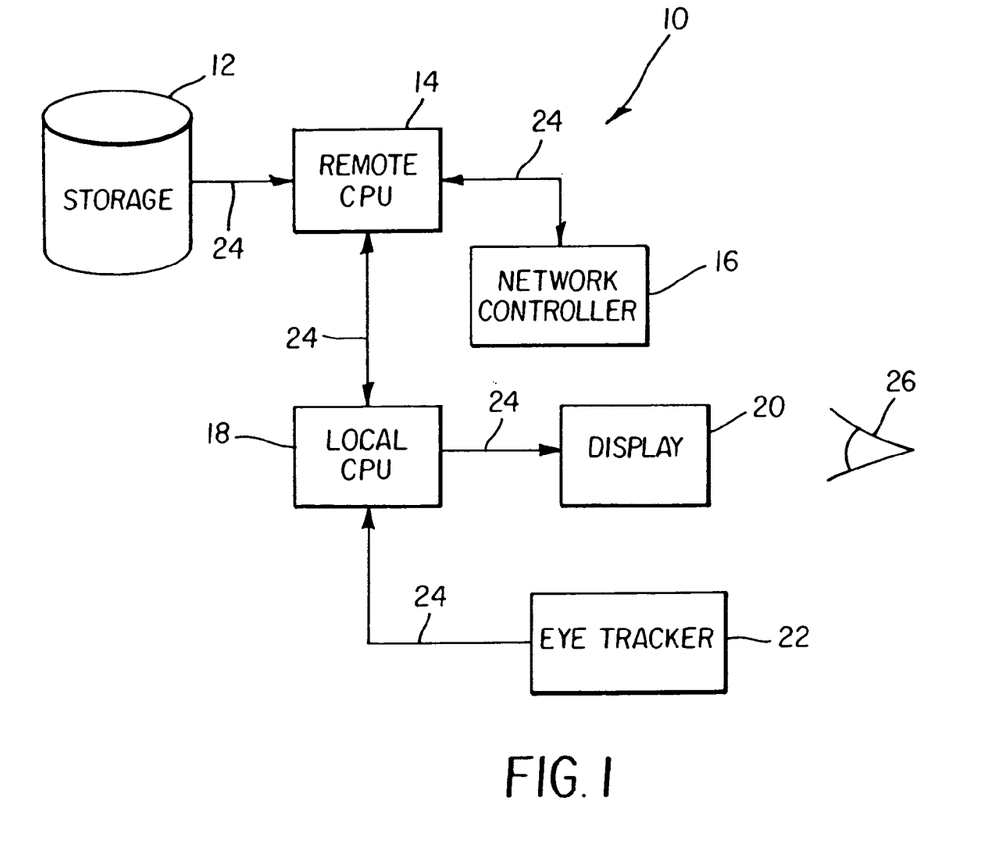
FIG. 1 is a schematic diagram of an image display system according to the present invention.

FIG. 1 illustrates a system configuration useful in practicing the present invention. The system 10 includes an image storage device 12, a remote CPU 14, a network controller 16, a local CPU 18, a display 20, and one or more devices 22 capable of determining the viewer's point of gaze on the display 20. The system components are connected by a communications network 24. In this system, the image storage device 12 could be any digital or optical storage device that could store the image information to be viewed. The remote CPU 14 is used primarily to determine the information required from storage based on gaze information and system bandwidth, to retrieve the relevant, compressed information from the storage device, and to transmit this information across the network 24. The network 24 could be any transmission channel, including digital cable, Internet, or wireless connection. The local CPU 18 receives the visual information, decompresses this information, processes the information for display onto the display 20, receives information from the eye tracking device, processes it, and transmits gaze information to the remote CPU 14. The display 20 could be any visual display, but is preferably an immersive display having a field of view of at least X degrees vertical and Y degrees horizontal. The eye tracker 22 could be any device that can be used to monitor the gaze point of a viewer 26, but ideally it is a system that monitors both head position and gaze position of the viewer.

It should be recognized that in an alternative embodiment, the remote CPU 14, network controller 16, and network 24 could be removed from the system and their functions be performed by local CPU 18. That is, local CPU 18 is connected directly to the image storage device 12 and retrieves the relevant visual information from the storage device and modifies the characteristics of the imagery that is obtained in response to the retrieval time of the storage device. In this configuration, the primary advantage of the system is to allow apparently very high resolution and field of view imagery to be retrieved from a storage media with relatively low read access time.

Figure 2:
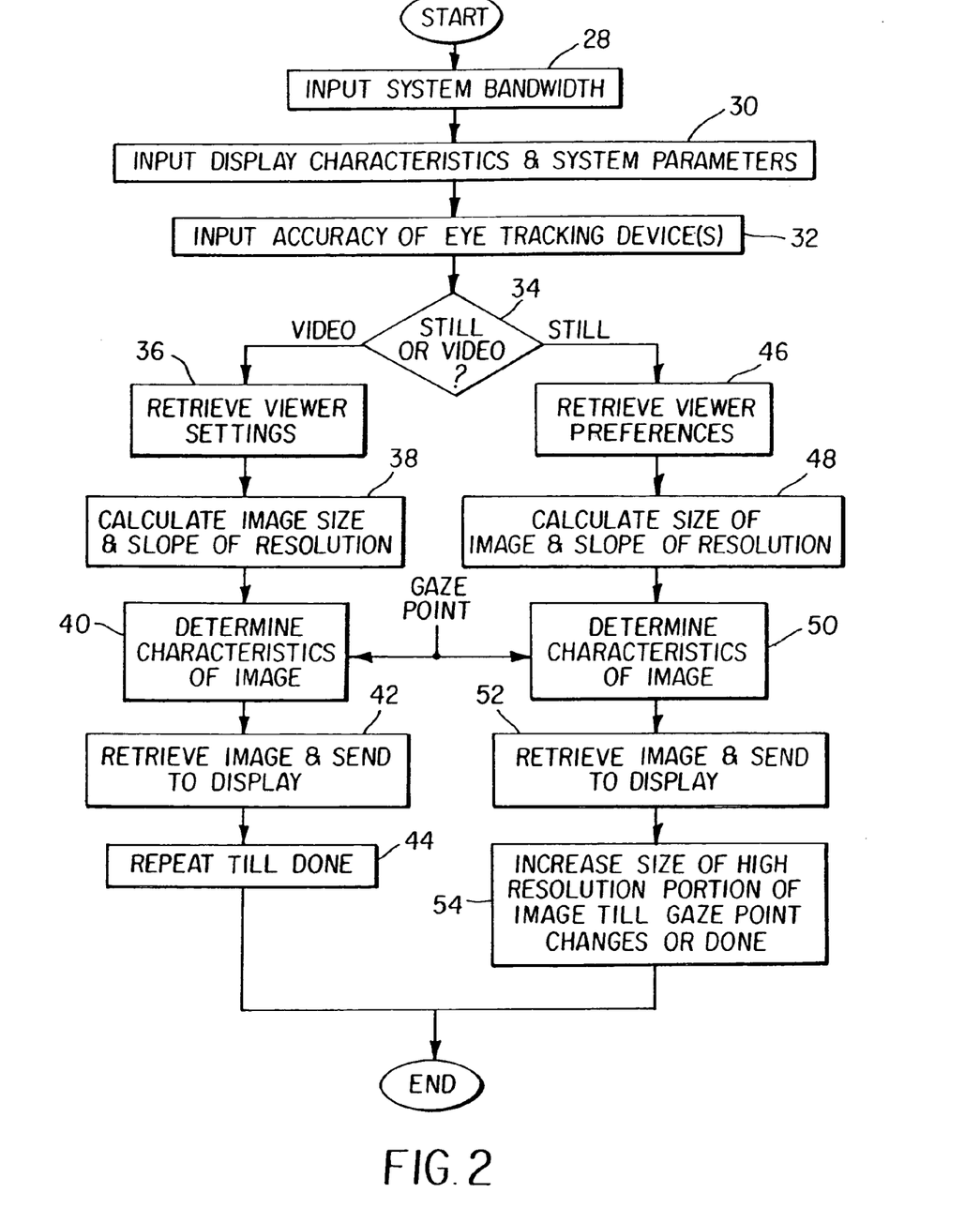
FIG. 2 is a flow chart summarizing the process used in the present invention.

In a preferred embodiment, the system 10 dynamically determines the bandwidth of the transmission channel that is available to the viewer, a number of important system characteristics, and viewer preferences to determine which information is to be retrieved from storage and transmitted to the display device. FIG. 2, provides a flow diagram illustrating a method for determining the image information that needs to be retrieved from the storage device and transmitted to the display device. As shown in this figure, when the system is initiated it first determines 28 the bandwidth that is available for image transmission. This value establishes a limit for the maximum amount of information that can be retrieved from storage and transmitted to the display.

The system then determines 30 important display and environmental characteristics. During this step, the system may determine important system parameters such as the resolution of the display device, the size of the display device, the viewer's viewing distance, the tone scale and maximum luminance of the display device and important ambient environment variables, such as the level of ambient illumination. As will be shown later, each of these parameters have a direct influence on how the system will retrieve and display information.

The system also determines 32 the accuracy of the eye tracking device. Although many parameters might be determined, the most important is the expected accuracy of the gaze point. This could be a static value assigned to the eye tracker or may be dynamic, depending on feedback from the system regarding the accuracy of the gaze point calibration that is performed by the eye tracking device.

Next the system determines 34 if the viewer wishes to view video or still imagery. This distinction is important, primarily because of the tradeoff function between system parameters such as resolution, field of view, and frame rate can be dramatically different for still and video images. This distinction can also be important since video information must be continuously updated to provide a stream of new images while still transmission may allow the perceived resolution of the system to be maximized while continuously increasing the actual resolution of the imagery.

If the viewer indicates a desire to view video images, the system retrieves 36 any viewer settings indicating preference for resolution, image size, and frame rate and calculates 38 the size of the high-resolution, foveated image that must be provided and the slope of the resolution requirements across the field of view. Based on this information and a determination of the gaze point, the system determines 40 the characteristics of the foveated image and which information must be retrieved from storage, retrieves 42 this information, and transmits the foveated image for display. Image retrieval and transmission then continues at the selected frame rate until the viewer provides additional input or makes a new point of gaze. If no changes in viewer preferences or point of gaze are made, this video retrieval and display continues 44. However, if the viewer changes his viewing preferences, new information is calculated to determine the characteristics of the foveated images. If the viewer indicates a desire to view something other than the current video stream, the system stops streaming images to the display.

If the viewer indicates a desire to view still images, the system retrieves 46 any viewer settings that indicate a preference for tradeoffs between resolution and image size. The system then calculates 48 the size of the high resolution, foveated image that must be provided and the slope of the resolution requirements across the field of view. Based on this information and a determination of the gaze point, the system determines 50 which information must be retrieved from storage, retrieves this information and transmits 52 an initial foveated image for display. The size of the high resolution inset is then increased 54 through the retrieval and transmission of additional high resolution information until the viewer changes the point of gaze, the entire high resolution image is transmitted, or the viewer changes their viewing preferences. If the point of gaze is changed, the system determines if additional high-resolution imagery is required and updates the information at the new gaze point. Otherwise, the system continues updating the image to provide a full resolution image. If the viewer changes their viewing preferences, new information is calculated to determine the characteristics of the foveated images. If the viewer indicates a desire to view something other than the still image, the system stops streaming the image to the display and responds to the viewer's new request.

As these images are received at the remote CPU 14, the compressed image information is decompressed and then written into video memory in the local CPU 18 to be displayed on the display.

We have described a high-level overview of the system. We will now provide a more detailed description of critical processes within this high level overview.

Estimation of Eye Tracker Accuracy

Many eye tracking devices exist which are capable of determining the point of gaze. However, the accuracy of these devices vary. This variation occurs both because of physical limitations of the devices, which introduce some error for every viewer, and error that exists due to errors in calibration by a particular viewer.

Typically, eye trackers must be calibrated before use. This calibration is often conducted by having the viewer look at various targets of known position. These targets are typically displayed at various locations on a display or are moved across the display device. When the viewer signals that he is looking at a target, the system records landmarks on the eye (e.g., the spatial location of the first and third corneal reflections from a known, directional infrared source that is used to illuminate the eye). As the viewer looks at a series of these targets on the display, the system can begin to build a model of changes in the position of eye landmarks as a function of gaze position. Later, this model is used to determine gaze position.

According to a preferred embodiment of the present invention, the accuracy of the eye tracking device is employed to determine the characteristics of the foveated image. This accuracy can be obtained by having a group of viewers look at a series of targets of known location, determining the predicted target location when each viewer looks at each of the targets, and determining the differences between the predicted and actual target location to calculate the error in target location. Some relevant statistical measure, such as the average error or two standard deviations of a Gaussian distribution fit to the error distribution, is then used as an estimate of system accuracy. The accuracy of the target location is likely to be dependent both on the position of the target and the time that has elapsed after calibration. Therefore, the system might store a model of the system accuracy as a function of both the target location and time since calibration. This model could then be used to determine the gaze position accuracy.

Alternately, the error in eye tracking can be determined for each viewer independently by having the viewer perform a calibration and then determine the accuracy of the calibration by looking at another group of targets and determining the error between the actual and predicted target locations. In this implementation, the viewer may be required to look at targets periodically to determine the accuracy of the system. Again, a statistical measure of the error (e.g., the two standard deviations of the mean) might be used to describe the accuracy of the system and this measure might be modeled as a function of display location and time since calibration.

Active Gaze Point Estimation

When attempting to provide an viewer with image data that has non-isotropic spatial fidelity as a function of the gaze position, an important system parameter is the amount of time required from the time the viewer's eye lands on a given point of gaze until high fidelity spatial information is displayed at this point of gaze. It is important to reduce this amount of time below the threshold of perception to achieve the highest possible quality display system.

During typical viewing, an viewer makes two different types of eye movements. The most typical of these are discrete eye movements, which are characterized by a period of between 16 and 600 ms during which the point of gaze does not change appreciably. After this phase of the eye movement is completed, a rapid shift in the point of gaze is made before the point of gaze is fixed for another discrete time period of about 16 to 600 ms. This discrete class of eye movements are typified by a relatively constant eye movement velocity of about 500 degrees per second, a value that is almost independent of the amount of change in gaze position (Land, et al., The Relations Between Head and Eye Movements During Driving, *Vision In Vehicles—V*., Gale et al. Editors, 1996 Elsevier Science B. V.). Since the eye movement velocity is practically constant regardless of the size of the eye movement, more time will pass between fixations for larger eye movements which typically land in image areas that were previously displayed with very low fidelity. The second type of eye movement is a smooth pursuit eye movement in which the eye continuously follows a moving element in the scene. These eye movements are continuous in nature and typically have a velocity of only a few degrees per second. This type of eye movement will result in small changes in the point of gaze where the image was previously displayed with relatively high fidelity.

In one embodiment, the local processor 18 may simply report the viewers' current point of gaze to the remote processor 14. In another, more-preferred embodiment, the gaze point estimation provided to the remote processor 14 is based upon an estimate of the eye gaze position at the time the remote processor 14 will deliver data to the local processor 18. This embodiment is particularly desirable in video systems as it can be estimated that the data for the next image will be delivered after a known time delay.

To provide this estimate, the current and recent eye movement velocity and acceleration is analyzed to estimate the point of gaze at the time the next frame of data will be delivered. Within this embodiment, it is assumed that excursion of a discrete eye movement will follow a straight line.

At any given time t, the location of the point of gaze is determined from an estimate of the velocity and acceleration of the movement in the point of gaze. This determination will preferably be made at a high temporal frequency that is significantly higher than is required for the transmission of image data. That is while image data may be refreshed between 30 and 100 times a second, the eye position will be determined at a frequency that is an order of magnitude higher than this frequency. The velocity and acceleration of the eye movement is determined by calculating the average first and second derivatives of the eye position from a series of the previous gaze points. The change in position of gaze for a time t plus a time delay td is then determined using a typical geometric formula such as:

$$D_d = vt_d + at_d^2 \quad (1)$$

Where $D_d$ is the projected distance of travel for the position of gaze, v is the velocity of the eye movement, and a is the acceleration (or deceleration) of the eye movement. This distance, together with the direction of the eye movement, is used to determine the estimate of the gaze position at a time t plus $t_d$. This estimated position is transmitted to the server to indicate the projected position of the point of gaze when the data will be available at the remote processor. This same approach may be used for smooth pursuit eye movements. However, for smooth pursuit eye movements, the projected distance of the change in the point of gaze will be much smaller.

Using this method, the region of the image with the highest fidelity will be close to the final point of gaze once an viewer makes a constant point of gaze. This prediction is particularly important when the user makes relatively large eye movements that may require 40 ms or more to execute and which result in a point of gaze in an area that has a very low fidelity before the viewer begins his or her eye movement. Further, this estimate may be continually updated to the remote processor 14. Since the method described herein, allows transmission of larger spatial extent, low-fidelity image data, followed by smaller spatial extent, high-fidelity image data, refinements of a point of gaze will allow the highest fidelity information to be selected and transmitted very close to the time of display, providing minimal errors in point of gaze estimates.

Determining Image Fidelity Requirements

To retrieve the appropriate image information as a function of gaze position and the distance from the current gaze position, it is necessary to define a method for determining the image fidelity requirements. This can be accomplished by using a model for certain response characteristics of the human visual system. Specifically, in a preferred embodiment we describe human visual performance using the contrast threshold function, which is a function that specifies the minimum contrast necessary to detect a spatial, sine-wave grating with a spatial frequency f.

It is important to recognize that the spatial resolution of the human eye is inhomogeneous as a function of the distance from the point of gaze. The maximum resolution is found in the fovea, which corresponds to the point of gaze, and resolution decreases as the distance from the fovea is increased. The distance from the center of the point of gaze is also referred to as eccentricity. In an eye-tracked display system, an object is to deliver the highest image fidelity to the viewer's point of gaze and to reduce the fidelity gradually as a function of the eccentricity. Therefore, a model for the contrast threshold function includes a dependence on the distance from the point of gaze. We denote this eccentricity-based contrast threshold function as $C_t(r, f)$, where f is the spatial frequency in cycles per degree (cpd) of visual angle and r is the distance from the point of gaze, expressed in degrees of visual angle.

The contrast threshold at the fovea, $C_t(0, f)$, has been measured in many psychophysical experiments in the prior art, and it can be modeled by the equation:

$$C_t(0,f) = [N + \eta \sigma^2/(f^2 + \sigma^2)] \exp(\alpha f), \quad (2)$$

where N, $\eta$, $\sigma$, and $\alpha$ are parameters with estimated values of 0.0024, 0.058, 0.1 cpd, and 0.17 degree, respectively, for luminance signals at moderate to bright adaptation levels. These parameters can be adjusted for chrominance signals, which occur when an image is represented in a luminance/chrominance space for efficient compression. The parameters can also be adjusted to account for the decreased sensitivity that occurs when the adaptation level is decreased (which would occur with a low brightness display).

The contrast threshold function for locations away from the point of gaze can then be calculated from:

$$C_t(r,f) = C_t(0,f) \exp(kfr) \quad (3)$$

where k is a parameter that controls the rate of change of the contrast threshold with eccentricity. In our preferred embodiment, the value of k will typically be between 0.030 to 0.057 with a preferred value of 0.045. Notice that based on Eq. 3, the contrast threshold increases rapidly with eccentricity at high spatial frequencies. These relationships indicate that high spatial frequency information is only retrievable by the center of the retina.

To apply this model, one must determine the distance of each point in the image from the center of the gaze position. However, it must be understood that typically there will be some error in the eye tracking system's estimate for the point of gaze. We denote this error as $r_e$. If the estimated distance $\hat{r}$ from the point of gaze is larger than the actual distance r from the point of gaze, the direct application of Eq. 3 would overestimate the contrast threshold values, leading to lower fidelity than is actually required at the given point. Therefore, it is desirable to err on the conservative side by assuming that the eye tracking system always overestimates the distance from the point of gaze. Consequently, we can adjust the distance r used in Eq. 3 by subtracting the eye tracking error from the estimated distance from the point of gaze:

$$r = \hat{r} - r_e, \quad (4)$$

when $\hat{r}$ is greater than $r_e$ and 0 otherwise. Note that the effective size of the highest fidelity region (i.e., the foveal region) in the image is determined by the error in the eye tracking system re.

For this model to be useful, one must understand how the image will appear to the human viewer. This requires either assuming or determining many characteristics of the display and the viewing environment. One important characteristic is the maximum contrast of the display, $C_d$, which can be calculated from the following equation:

$$C_d = \left( \frac{(L_{max} + I_a R) - (L_{min} + I_a R)}{(L_{max} + I_a R) + (L_{min} + I_a R)} \right), \quad (5)$$

where $L_{max}$ is the maximum luminance of the display, $L_{min}$ is the minimum luminance of the display, $I_a$ is the ambient illumination, and R is the reflectance of the display expressed in decimal form. Other important characteristics include the number of display pixels, the size of the display, and the distance from the viewer to the display, which is known as the viewing distance. The parameters allow one to convert the spatial frequency in cycles per pixel on the display to cycles per degree of visual angle. This conversion is necessary when using Eq. 3 to determine the image fidelity requirement as is described in the next section. The equation for converting from cycles per pixel, $f_p$, to cycles per degree, f, is:

$$f = \frac{f_p}{\tan^{-1}\left(\frac{s}{n_p d}\right)} \qquad (6)$$

where s is the active size of the display along some dimension, $n_p$ is the total number of displayed pixels along the same dimension, and d is the viewing distance. As the viewing distance is increased, a given value of $f_p$ will map to a larger value of f which leads to a decrease in the contrast threshold value produced by Eqs. 2 and 3.

Values such as the active area of the display, number of display pixels, and display reflectance may be recorded in the display's memory during manufacture and reported to the system using industry standard protocols, such as VESA's data display channel. Minimum and maximum luminance may be determined based on sensors that are designed to measure the luminance of the display or they may be derived from other relevant display parameters, such as the beam current in a CRT. Ambient illumination can be measured through the use of a light sensor attached to a display and the viewer's viewing distance may be derived from the apparatus that is used to determine head and eye gaze position. While these display and environmental variables may be provided by the described means, it is possible that some or all of this information may be unavailable. In such cases, it is necessary to assume a nominal value for each of the parameters that were discussed.

Image Storage and Retrieval

The image storage device 12 contains high-resolution information for all spatial locations in an image, as it is not known a priori where the point of gaze will be for a given individual and a given image or image sequence. For a practical and cost-effective system, an efficient compressed representation is required for the high-resolution images in order to minimize the amount of information that must be stored. Any number of well-known compression techniques, such as the current JPEG or MPEG standards, can be used to provide this efficient storage. However, the present invention places additional constraints on the compressed representation in that it must allow for the rapid retrieval of spatial and resolution subsets of the high-resolution image information as the gaze point changes. Moreover, these spatial and resolution subsets must be compactly represented so that the necessary image information can be transmitted across the network within allotted bandwidth. The efficient retrieval and transmission of spatial and resolution subsets is very difficult to accomplish with the current JPEG and MPEG standards. They are primarily designed to provide constant resolution across the full spatial extent of an image, which is inconsistent with the concept of foveated imaging.

There are other compressed data representations that are better suited for use in a foveated imaging system. In particular, the JPEG 2000 compression standard has recently been defined, and JPEG 2000 provides a framework that integrates very well with the requirements of foveated imaging. This is because JPEG 2000 uses a wavelet transform as a key component in the compression process. A wavelet transform decomposes an N×N original image into an N×N set of wavelet coefficients, where each coefficient corresponds both to a given spatial location in the original image and to a given range of frequencies (called a subband). Thus, the wavelet coefficients provide a space-frequency representation, which allows convenient access to the spatial and resolution subsets that are needed in foveated imaging.

JPEG 2000 is not the only compression technique that uses a wavelet decomposition (or more generally, a subband decomposition), and any other technique that uses a subband decomposition would provide similar benefits. Furthermore, resolution-based hierarchical decompositions (e.g., a Gaussian pyramid) can be used to provide access to spatial and resolution subsets, although these representations are generally less efficient than a wavelet or subband representation. However, in the following description, the JPEG 2000 standard is used because it is well-defined and contains appropriate data structures to enable foveated imaging. It is understood that similar concepts can be used with other wavelet, subband, or resolution-based hierarchical compression techniques, and in fact, it may be advantageous to deviate from the JPEG 2000 standard to provide features that are not enabled with a fully compliant JPEG 2000 system. JPEG 2000 is primarily a standard for still-frame images, but it can easily be applied to each frame in an image sequence. In the present invention, it is assumed that an image sequence is represented as a set of independently encoded frames. While this may result in lower compression efficiency than a technique that takes advantage of frame-to-frame correlation (such as MPEG), it greatly simplifies access to the necessary data as the gaze position or system bandwidth requirements change over time.

Figure 3:
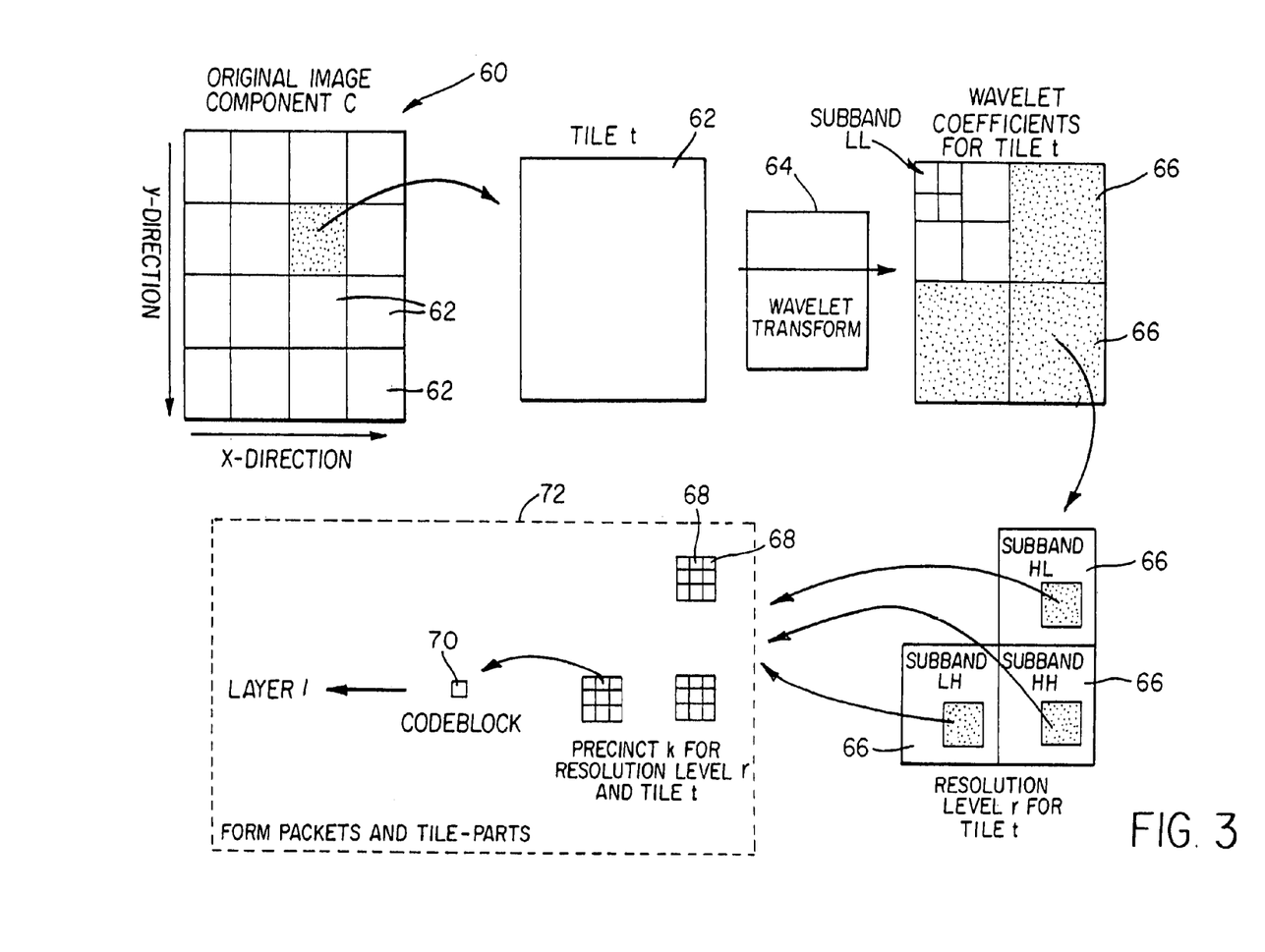
FIG. 3 is diagram illustrating the relationship between the data structures used in the present invention.

To understand the use of JPEG 2000 in the present invention, it is first necessary to review some of the compressed data structures that are provided within the standard. These data structures include: components, tiles, resolution levels, precincts, and layers. All of these data structures relate to the organization of the wavelet coefficients within the compressed codestream. The various data structures provide: (1) access to color channels, e.g., RGB or YCbCr, (through components); (2) access to spatial regions (through tiles); (3) access to frequency regions (through resolutions levels); (4) access to space-frequency regions (through precincts); and (5) access to coefficient amplitudes in a given space-frequency region (through layers). The relationship of these data structures is illustrated in FIG. 3 and described in the following paragraphs. For simplicity, we will primarily consider only a single color component (e.g., the luminance channel), but three color components (a luminance and two chrominance components) typically would be used in practice. A complete description of the JPEG 2000 standard can be found in: "JPEG 2000 Image Coding System—Part 1," ISO/IEC 15444-1/ITU-T Rec. T.800.

In JPEG 2000, an image component 60 is first partitioned into one or more tiles 62, where the tiles are a constant rectangular size throughout the image. Each tile is encoded independently of the other tiles. The tile size has an effect on the overall coding efficiency, with smaller tile sizes being less efficient. The smallest practical tile size is 256×256 or 128×128. Tiles 62 provide a means for coarsely accessing different spatial regions of an image, and for very high-resolution images, tiles may provide sufficiently precise access to different spatial regions within an image. If not, smaller spatial regions can be accessed using precincts, which will be described shortly.

Each tile 62 is decomposed using a wavelet transform 64 to produce a number of resolution levels, where each resolution level is composed of one or more frequency subbands 66. For most resolution levels, there are three subbands, corresponding to image content that is oriented vertically (subband HL), horizontally (subband LH), and diagonally (subband HH). At the lowest resolution level, there is only one subband (subband LL), where the coefficients correspond to a lowpass filtered and subsampled version of the original image. The L and H labels designate lowpass and highpass filtering, respectively, within the wavelet transform (e.g., HL refers to highpass (H) filtering in the x-direction and lowpass (L) filtering in the y-direction).

Each resolution level is further partitioned into one or more precincts 68, where the precincts are a constant rectangular size throughout a resolution level. Precincts 68 provide a means for accessing smaller spatial regions than can be achieved with tiles. However, precincts cannot be arbitrarily small as a precinct is comprised of codeblocks 70, which are the smallest independent coding unit within JPEG 2000. The size of a codeblock 70 affects the overall coding efficiency, with smaller codeblocks being less efficient. The smallest practical codeblock size is 64×64 or 32×32, and a precinct can be as small as one codeblock.

Finally, in JPEG 2000, the coefficients for each codeblock are encoded on a bitplane-by-bitplane basis using an arithmetic coder. A layer is some number of consecutive bitplane coding passes from each codeblock, and the number of layers can vary from codeblock to codeblock. In general, as additional layers are included in the codestream, the precision of the wavelet coefficients is increased and the fidelity is improved in the corresponding spatial region. Each layer can thus correspond to a desired increment in fidelity.

In addition to these fundamental data structures, there are also two higher level structures known as packets and tile-parts 72. A packet is simply a continuous segment in the compressed data codestream that represents information from a specific component, tile, resolution level, precinct, and layer. The complete sequence of packets that represent a particular tile may be divided into one or more tile-parts 72. Tile-parts from different tiles may be distributed throughout the compressed codestream in any desired fashion, with the constraint that the tile-parts from a single tile must appear in the same order as the original sequence of packets for that tile. The packet and tile-part structures provide mechanisms for organizing the compressed data into contiguous groups of bytes that can be streamed efficiently onto the network.

With these data structures now described, we can consider how the compressed codestream can be ordered to provide efficient access to the necessary data in a foveated imaging system. JPEG 2000 allows for a number of different progression orderings of the data packets based upon the component, resolution level, precinct, and layer structures. Furthermore, JPEG 2000 allows the ordering to be changed at various points in the codestream. In the present invention, the progression orderings are selected to efficiently provide the required fidelity in a given spatial region in accordance with the model of the contrast threshold function, subject to the bandwidth constraints of the network. To meet this overall goal, we propose the following hierarchy of requirements for ordering the compressed data to be transmitted across the network:

1) Send data to fill the entire display with a minimum level of information (i.e., "background").
2) Send data to refine details in the point of gaze region.
3) Send data to refine details in other regions, as allowed by the available bandwidth.

The first requirement is that the entire display should always be filled with some minimal amount of low-resolution information so that there are no completely blank (or dark) areas in the display. The presence of such areas would be detectable even in the periphery of the field of view and would likely be highly objectionable. The amount of information that is required to transmit the low-resolution information is relatively small, and it does not place a substantial burden on the available bandwidth. The specific information that is sent consists of one or more low-resolution levels from all tiles and components, including specifically the lowest frequency subband LL. For these low-resolution levels, it is necessary to transmit data for all precincts in the low-resolution levels, but not necessarily all layers within each precinct. It may be sufficient to send only a few layers to achieve the necessary fidelity. In JPEG 2000 nomenclature, this type of progression ordering is known as a "resolution level-layer-component-position" progression. This ordering is also used when storing the low-resolution data on the storage device so that it is a simple matter to stream the corresponding contiguous data packets onto the network.

Given this background image that represents the low-resolution information, it is then necessary to fill in higher resolution detail information in accordance with viewer's point of gaze and the corresponding contrast threshold function values across the field of view. This requirement suggests that the remaining compressed data packets should be ordered first according to spatial location and then according to resolution levels and finally according to precincts and layers. In addition, the data can be organized according to the color component, so that component information can be easily prioritized (for example, sending the luminance channel first because of its perceptual importance). In JPEG 2000 terminology, this type of ordering is known as a "component-position-resolution level-layer" ordering. The codestream is thus organized so that all data packets for a given tile are contiguous, and within a tile, all data packets for a given precinct are contiguous. In this way, the data packets for a particular spatial location can be efficiently accessed by locating the corresponding tile and/or precinct boundaries in the codestream. JPEG 2000 provides unique data "markers" that allow one to easily determine the tile positions in the codestream, but it may be advantageous to specify a separate table of byte-count offsets. This table consists of spatial locations in the original image (e.g., the point of gaze) and for each spatial location, there is a corresponding byte-count offset (e.g., from the beginning of the file) that indicates the start of the packets for a given tile and/or precinct. This type of lookup table provides an efficient means to locate the desired data packets when forming the codestream for transmission over the network.

Figure 4:
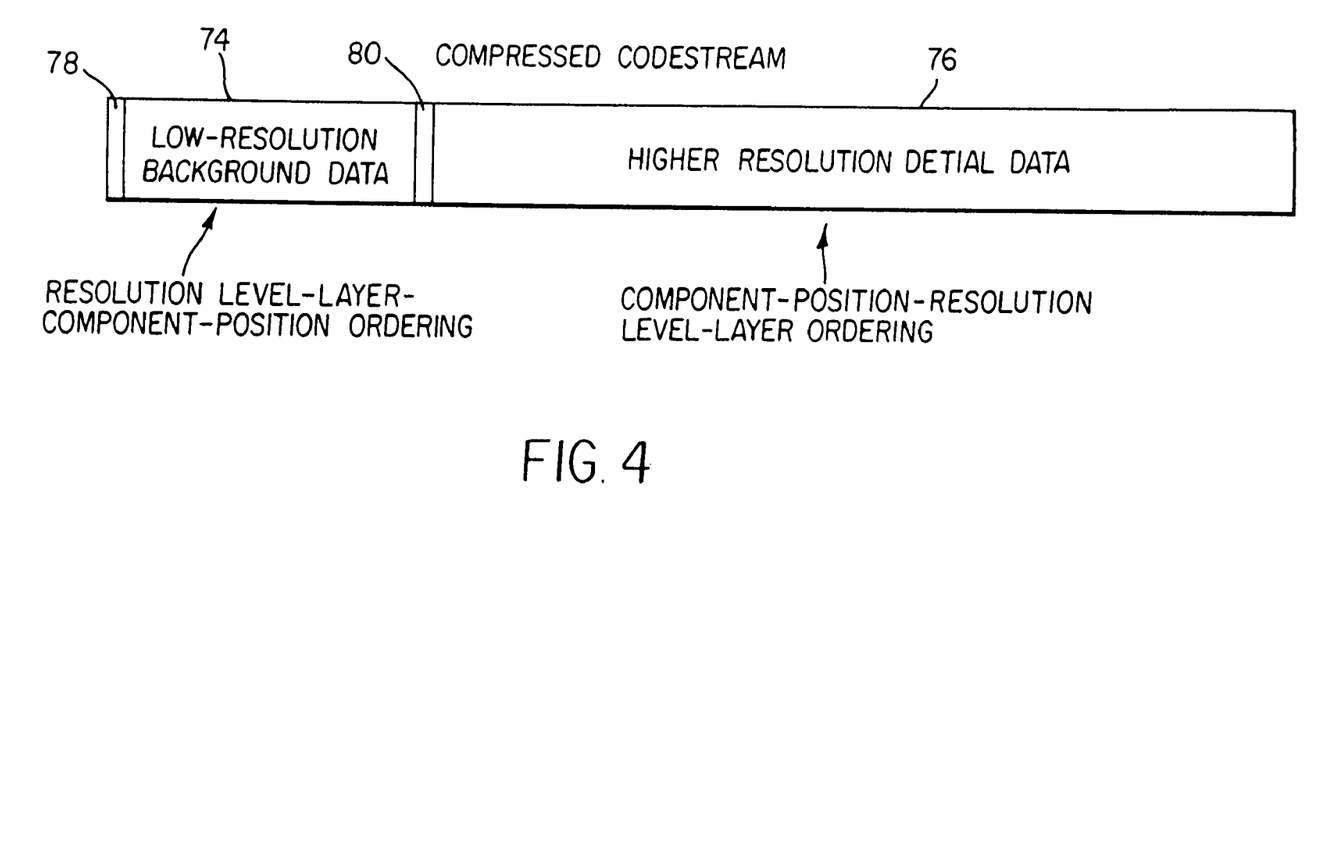
FIG. 4 is a diagram illustrating the code stream used in the present invention.

The basic ordering of the codestream is depicted in FIG. 4. The first section 74 is organized according to the "resolution level-layer-component-position" ordering to allow efficient streaming of the low-resolution background information. The second section 76 is organized according to the "component-position-resolution level-layer" to allow efficient streaming of the higher resolution data for a particular image region. Unique marker segments 78, 80 in JPEG 2000 are used to indicate which ordering is being used at a given point in the codestream so that the codestream may be correctly interpreted.

It is important to make a distinction between the codestream that is stored on the storage device and the codestream that is transmitted over the network. As mentioned previously, the stored codestream contains high-resolution information for all spatial locations in an image, while the transmitted codestream is a subset of the stored codestream in accordance with the gaze point and bandwidth constraints. Although the general structure of both codestreams follows that shown in FIG. 4, the specific ordering of the data packets for the high-resolution detail information will be different because of a need to prioritize the data so that the fidelity in the gaze point region of the viewer is improved first. If this prioritization is not performed, it is possible that there may not be sufficient bandwidth to provide the desired level of fidelity in the gaze point region, i.e., too much of the available bandwidth may have been consumed in representing less critical areas away from the point of gaze. This means that the data packets representing high-resolution detail information for the gaze point region must be retrieved from storage and placed at the beginning of the transmitted codestream. Subsequent data packets in the codestream would correspond to the detail information for areas away from the point of gaze.

Figure 5:
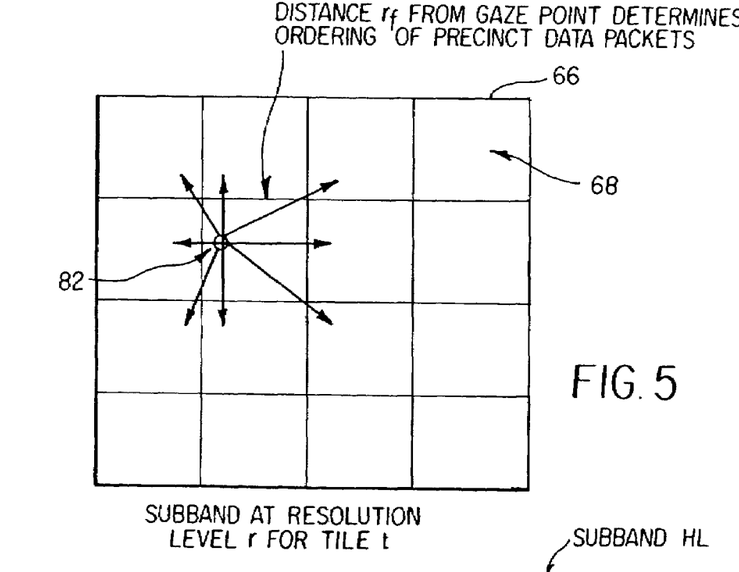
FIG. 5 is a diagram illustrating the minimum distance of any point in the precinct from a gaze point.
Figure 6:
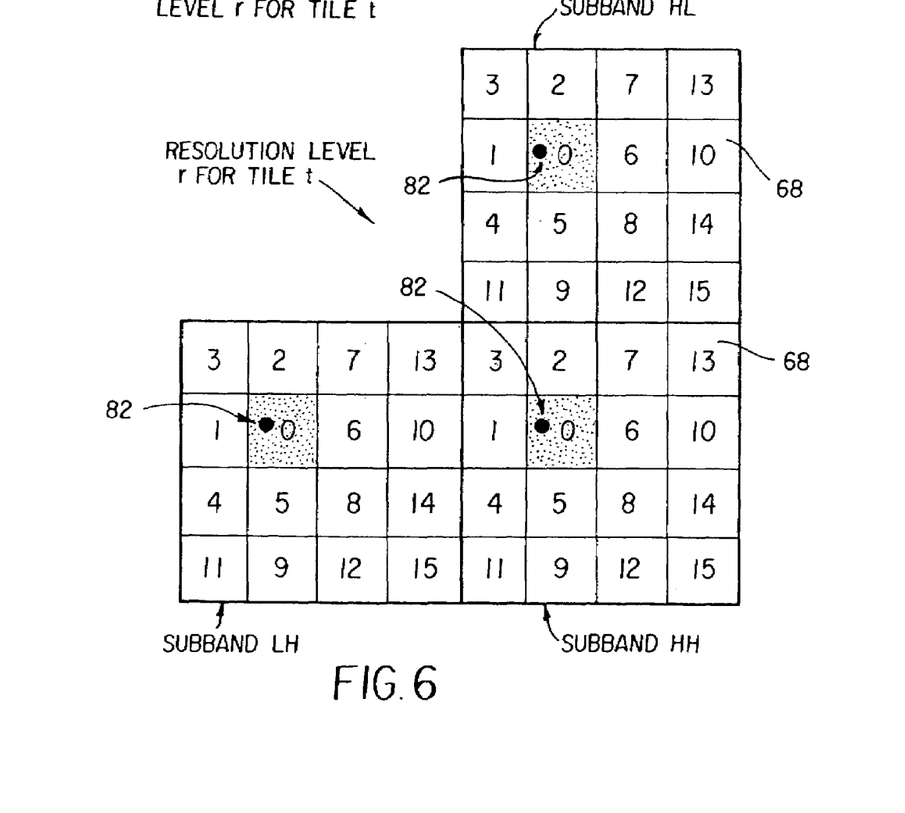
FIG. 6 is a diagram illustrating one precinct ordering where the ordering of the precincts at a single resolution level progresses from 0 to 15, where the precinct labeled 0 is given the highest priority and the precinct labeled 15 is given the lowest priority.

The prioritization of the data packets is performed using the distance r from the center of the gaze position, which is provided by the eye tracker 22 to both the local and remote CPUs 18 and 14 respectively. For each precinct in an image, the minimum distance of any point in the precinct from the gaze point is computed, as shown in FIG. 5. Data packets that represent the precincts (over one or more resolution levels) are prioritized the order of closest distance to furthest distance. In this way, the fidelity is increased first in the gaze point region 82, and the surrounding regions are then refined subsequently. An example of the precinct ordering is illustrated in FIG. 6, where the ordering of the precincts 68 at a single resolution level progresses from 0 to 15, where the precinct labeled 0 is given the highest priority and the precinct labeled 15 is given the lowest priority. This same prioritization could also be performed using the larger spatial structure of tiles, instead of precincts, which would provide less localization, but may be more efficient in terms of streaming compressed data from the server. It is possible to send the compressed data for the precincts and/or tiles using a minimum of overhead information because the gaze point 82 (and consequently the ordering) is known at both the local and remote CPUs 18 and 14 respectively.

Now, the distance r from the gaze point only tells us how the data packets from the various precincts should be prioritized; it does not indicate how much information should be sent for each precinct. Because of the bandwidth constraints of the network, the goal is to send only as much detail as is needed for each spatial region in the image. The determination of the amount of detail information for each spatial region is performed using the contrast threshold function that was described previously. The contrast threshold function can be used to compute the precision that is required for the wavelet coefficients to ensure that an viewer will not be able to detect any degradations in the displayed image.

To apply the contrast threshold function to the wavelet coefficients, it is necessary to understand the impact of the bit plane encoding process that is used in JPEG 2000. Suppose a wavelet coefficient is initially quantized with a step size of $\Delta$. If the k least significant bit planes of the coefficient are then discarded, the effective quantizer step size is increased to $2^k\Delta$. A larger quantizer step size will result in more quantization, which may lead to lower fidelity. If an additional bit plane is included in the compressed codestream, the effective quantizer step size is reduced to $2^{(k-1)}\Delta$ and the precision of the wavelet coefficient is improved. Thus, the effective quantizer step size (and the corresponding number of retained bit planes) for a given wavelet coefficient determines the fidelity of the compressed image. The effective quantizer step size that is required for no loss in visual fidelity is directly related to the contrast threshold function.

For simplicity, the effective quantizer step size is determined as a function of the wavelet subband, rather than the individual wavelet coefficient. Specifically, for a subband i with a representative frequency $f_i$ (e.g., the center frequency of the subband and a given distance r from the point of gaze), the quantizer step size $Q_i$ that results in just noticeable distortion in the reconstructed image is:

$$Q_i = \alpha \cdot \beta_i \cdot C_t(r, f_i), \quad (7)$$

where $\alpha$ is a constant that depends upon the maximum contrast of the display, $\beta_i$ is a gain term that depends on the particular subband i, and the frequency $f_i$ has been mapped into the appropriate units based on the viewing distance, as in Eq. 5. This relationship between contrast threshold and quantizer step size has been described previously; for example, see Jones et al., Comparative study of wavelet and DCT decompositions with equivalent quantization and encoding strategies for medical images, *Proc. SPIE Medical Imaging '95*, Vol. 2431, pp. 571–582. Note that the value of r can be modified as in Eq. 4 to account for the error in eye tracking device. Also, as discussed previously, the particular parameters used to model $C_t(r, f_i)$ in Eq. 2 can be adjusted depending upon whether the luminance or chrominance components are being quantized.

The importance of Eq. 7 is that it tells us the precision (i.e., quantizer step size $Q_i$) that is needed for a precinct in subband i (with representative frequency $f_i$), located at a distance r from the point of gaze. Given the step size $Q_i$, it is a simple matter to compute the number of bit planes that must be transmitted for a precinct, i.e., discard the k least significant bit planes such that:

$$2^k \Delta_i \leq Q_i, \quad (8)$$

where $\Delta_i$ is the initial quantizer step size for subband i.

This computations of Eqs. 7 and 8 are repeated for each precinct in each subband, in accordance with the distance from the center of the gaze point and the subband representative frequency. Thus, we have determined precisely what information should be sent to the display to ensure no loss in fidelity as perceived by an viewer. Moreover, the prioritization of the precincts based upon the distance from the gaze point determines the order in which the information should be sent.

Bandwidth Constraints

The process of using the contrast threshold to determine the precision for each precinct will produce a displayed image with no noticeable degradation if all of the required bit planes are transmitted to the display device. However, this may not always be possible because of bandwidth limitations. Ideally, the allocation of available bandwidth between the various precincts would be done in some optimal manner, but such optimization is usually done in an iterative manner, which may be too computationally expensive in a real-time display system. The problem is that the amount of compressed data that is required for a particular spatial region will vary significantly with the image content and the quantizer step size. Until the compressed codestream is actually constructed, it is generally difficult to predict if there is sufficient bandwidth for the entire codestream. This implies that there is need for real-time rate control.

In a real-time rate-control system, the number of transmitted bits is monitored as the transmission proceeds, and encoding decisions are made based upon how much of the allotted bandwidth has been used. As the number of transmitted bits approaches the allotted bandwidth, it is necessary to discard more of the bit planes, which may lead to noticeable degradations in the displayed image. The goal is to minimize the degradations that are apparent to the viewer. There are a number of approaches that could be used, but in a preferred embodiment, the parameter k in Eq. 3 is modified to provide a greater increase in the contrast threshold with eccentricity. In this way, the gaze point region in the displayed image would still be reconstructed with high fidelity, but the areas that are away from the gaze point would have degradations that may be noticeable. However, the areas that are away from the gaze point inherently correspond to increased contrast threshold values, where the visual system sensitivity is low, and the impact of the degradations will be minimized.

Multiple Viewers

In some applications of the present invention, there may be more than one viewer. In general, the viewers will have different points of gaze, and it is necessary to refine the detail information in accordance with these different gaze points. As before, we have the issues of: 1) prioritization of the data packets and 2) precision of the wavelet coefficients.

Regarding the data packet prioritization, it can generally be assumed that the various viewers have equal importance. Thus, a reasonable strategy is to alternate data packets in the codestream among the viewers. For example, a precinct for the gaze point of viewer 1 would be transmitted first, followed a precinct for the gaze point of viewer 2. Then, the next precinct for viewer 1 would be sent, followed by the next precinct for viewer 2, and so on. If it is known that one viewer has a greater importance, the data packets for more precincts could be sent first for that viewer. An example of this scenario is when there are two viewers, and the eye tracker is able to detect that one viewer is frequently closing his or her eyes (i.e., falling asleep).

Now, we address the precision of the wavelet coefficients. Although the methods described by Eqs. 7 and 8 are still valid, the fields of view for the different viewers will overlap, and we must consider the most critical viewing condition at each spatial location in the image. For a given precinct, we must compute its distance r from the gaze point of each viewer, and then use the closest gaze point distance in computing the quantizer step size via Eq. 7. As a result, even though the prioritization of a precinct may depend upon one viewer, then precision that is used for the precinct may be determined by another viewer.

Viewer Selection of Field of View and Frame Rate

It must also be recognized that the bandwidth constraints may impose limitations that prevent the viewer from obtaining satisfactory fidelity. At this time, the viewer may desire to make other tradeoffs, including reducing the field of view of the image and/or the frame rate of video imagery. Here the viewer simply indicates the desired field of view of the image and/or the frame rate of the image through a dialog. These selections will affect the bandwidth that is available for a given image, thus potentially allowing for improved picture fidelity, depending upon the specific selections.

When field of view (image size) is changed, the image data outside the selected field of view can be truncated, and no information is transmitted for the corresponding tiles or precincts. If the frame rate is altered, the system simply transmits and displays the images at the selected rate. If a slower frame rate is selected, the fidelity of each frame will increase, at the possible expense of non-smooth motion. A higher frame rate will provide smoother motion, but at the expense of lower fidelity for each frame. The impact of these tradeoffs depends greatly upon the scene content.

Passive Gaze Point Estimation

An eye tracking device plays an important role in the previously described embodiment of the system. However, it may not always be practical to dynamically determine the gaze positions of all viewers of a system. When active gaze point estimation is not practical, an alternative means for determining the likely gaze positions within an image may be used to replace the eye tracking device. In this embodiment of the system, two different techniques may be applied to determine the likely gaze positions in an image. These include performing image analysis to determine likely positions of gaze, and measurement and statistical description of probability density maps for the typical points of gaze within an image as determined by a set of viewers.

It should be noted, however, that neither of these techniques are deterministic as any viewer's point of gaze changes about every 100 to 300 ms. For this reason, neither technique can be used to predict an viewer's exact point of gaze. Instead, each of these techniques can only predict the regions of the image where an viewer is most likely to direct his or her point of gaze during normal image viewing. To achieve robust application of either of these techniques, the image processing system must therefore enable the image to be processed to accommodate multiple gaze positions.

The application of image analysis to predict areas of an image that are likely to attract an viewer's gaze typically involves determining the image regions that contain one or more particularly high contrast edges or other salient information. Methods for determining probability maps through image analysis are well documented in the art and descriptions can be found by several authors, including: Itti et al., A saliency-based search mechanism for overt and covert shifts of visual attention, *Vision Research*, vol. 40, 2000, pp.1489–1506; Cartier et al., Target attractiveness model for field-of-view search, *Optical Engineering,* 1998, vol 37(7), pp. 1923–1936; Reinagel et al., Natural scene statistics at the centre of gaze, *Computational Neural Systems,* 1999, vol. 10, pp. 341–350.

To determine a probability density map of likely points of gaze for a group of typical viewers, it is necessary to have them perform a task similar to the task of the final viewers. Each viewer views the image on a representative display while active eye tracking is being performed and the viewer's gaze positions are recorded. The data from this group of viewers is then combined into a single data structure containing coordinates for each of the points of gaze determined for each individual frame of image data.

It should also be noted that as described earlier, the local processor transmits the estimated gaze position to the remote processor. As this information is transmitted, the system can store this data as a function of the image that is displayed. Therefore, if a baseline system is built that includes an eye tracking system, this system can be used to archive gaze information from a potentially large number of viewers. This data may be used to determine probability density maps for systems that do not include eye tracking devices. This same data may also be leveraged for many other uses, including the advertising or price determination of real estate within the imagery (e.g., a person who purchases an advertisement slot or a bill board within the virtual environment might be charged based upon the number of times a typical user views this advertising space).

The probability density map for each image may then be analyzed using an unsupervised clustering technique, such as unsupervised k-means clustering or a hierarchical clustering technique to determine the number of clusters of points of gaze within the image. Once the initial clusters have been acquired, points may be culled out of these individual clusters based on their spatial position with respect to other gaze points. For example, any gaze point that is more than one half of a degree of visual angle from the mean of any cluster may be culled out into its own cluster. The mean and standard deviation of each cluster of points of gaze can then be determined. The image may then be processed, assuming a point of gaze at the mean location of each cluster. A statistical measure of the variance around that mean can be used as an input to Eq. 4, indicating the error ($r_e$) in the point of eye point of gaze.

When applying this method, it must also be realized that it may not always be necessary or possible to provide the best possible fidelity at each point of gaze. Therefore, the number of gaze positions in any cluster or the number of gaze positions in a cluster weighted by the average gaze duration for that cluster may be used to determine the importance of each cluster. When this is necessary, a number of strategies may be followed to reduce the information in the final image. For example, only the most important clusters may be considered as likely gaze positions and the image processed with only these likely gaze positions having high fidelity and other positions having lower fidelity or the peak fidelity can be reduced based upon the relative importance of the clusters of gaze positions.

The invention has been described in detail with particular reference to certain preferred embodiments thereof, but it will be understood that variations and modifications can be effected within the spirit and scope of the invention.

PARTS LIST 10 image display system
12 image storage device
14 remote CPU
16 network controller
18 local CPU
20 display
22 point of gaze tracker
24 communications network
26 viewer
28 determine bandwidth step
30 determine characteristics step
32 determine accuracy of eye tracking device step
34 determine still or video step
36 retrieve viewer settings step
38 calculate image size step
40 determine characteristics of image step
42 retrieve and transmit image step
44 continue display step
46 retrieve viewer setting step
48 calculate image size step
50 determine information to be retrieved step
52 retrieve and transmit image step
54 increase size of high resolution area step
60 image component
62 tile
64 decomposition step
66 subband
68 precinct
70 codeblock
72 tile-part
74 first codestream section
76 second codestream section
78 codestream section marker
80 codestream section marker
82 gaze point

What is claimed is:

1. A method for providing JPEG 2000 compressed image data, containing one or more tiles and one or more precincts, for subsequent transmission to a display, comprising the steps of:

storing the image data in a codestream, said codestream including a first section having a minimum resolution level of image information of an image using a resolution level-layer-component-position progression ordering and a second section having a maximum resolution level of image details of all of said image using a component-position-resolution level-layer progression ordering.

2. The method according to claim 1, wherein the first section has all precincts from one or more low resolution levels.

3. The method according to claim 1, wherein the second section has precincts that are not included in the first section.

4. The method according to claim 1, wherein the second section is organized so that all data packets for each tile are contiguous and all data packets for each precinct within a tile are contiguous.

5. The method according to claim 1, further comprising the step of:

producing a lookup table that associates a spatial location with a byte-count offset for the start of the data packets for each tile.

6. A method for storing JPEG 2000 compressed image data, containing one or more tiles and one or more precincts, for subsequent transmission to a display, comprising the steps of:

storing first data having a minimum resolution level of image information using a resolution level-layer-component-position progression ordering; and storing second data having a maximum resolution level of image details using a component-position-resolution level-layer progression ordering; and further comprising the step of:

producing a lookup table that associates a spatial location with a byte-count offset for the start of the data packets for each precinct in each tile.

7. A method for providing compressed image data, containing one or more tiles and one or more precincts, comprising the steps of:

a) storing first data that represents a minimum resolution level of image information in a first section of a codestream;

b) storing second data that represents remaining resolution levels of image details in a second section of said codestream, using a component-position-resolution level-layer progression ordering;

c) prioritizing a plurality of data packets of said stored second data; and d) transmitting, in order, said first section and at least part of said plurality of prioritized data packets of said stored second data.

8. The method according to claim 7, wherein the first data represent all precincts from one or more low resolution levels.

9. The method according to claim 8, wherein the second data represent remaining precincts that are not included in the first data.

10. The method according to claim 9, wherein the second data is organized so that all data packets for each tile are contiguous and all data packets for each precinct within a tile are contiguous.

11. The method according to claim 7, further comprising the step of:
  c) producing a lookup table that associates a spatial location with a byte-count offset for the start of the data packets for each tile.

12. A method for storing compressed image data, containing one or more tiles and one or more precincts, for subsequent transmission to a display that is viewed by an observer having a point of gaze, comprising the steps of:
  a) storing first data that represents a minimum resolution level of image information;
  b) storing second data that represents remaining resolution levels of image details using a component-position-resolution level-layer progression ordering; and
  c) producing a lookup table that associates a spatial location with a byte-count offset for the start of the data packets for each precinct in each tile.

13. A method for providing a digital image as compressed image data containing one or more tiles and one or more precincts, comprising the steps of:
  storing first data of the digital image in a first section of a codestream; and
  storing second data of said digital image in a second section of said codestream, using a component-position-resolution level-layer progression ordering, said first data and said second data being differently ordered, said second data being higher resolution image information than said first data.

14. The method of claim 13 wherein the first data has precincts from one or more low resolution levels.

15. The method of claim 14 wherein the second data has all precincts that are not included in the first data.

16. The method of claim 13 wherein the second data is organized so that all data packets for each tile are contiguous and all data packets for each precinct within a tile are contiguous.

17. The method of claim 13 further comprising the step of:
  producing a lookup table that associates a spatial location with a byte-count offset for the start of the data packets for each tile.

18. A method for storing a digital image as compressed image data containing one or more tiles and one or more precincts, comprising the steps of:
  storing first data of the digital image; and
  storing second data of said digital image using a component-position-resolution level-layer progression ordering, said first data and said second data being differently ordered, said second data being higher resolution image information than said first data; and
  further comprising the step of:
  producing a lookup table that associates a spatial location with a byte-count offset for the start of the data packets for each precinct in each tile.

19. A method for providing a digital image as compressed image data containing one or more tiles and one or more precincts, comprising the steps of:
  storing first data of the digital image in a first section of a codestream, using a resolution level-layer-component-position progression ordering; and
  storing second data of said digital image in a second section of said codestream, using a component-position-resolution level-layer progression ordering, said second data being higher resolution image information than said first data.

20. The method of claim 19 wherein said first data includes a minimum resolution level and said second data is remaining resolution levels of said digital image.

* * * * *